Oct. 16, 1962     K. D. MATTSSON     3,058,395
REAR VISION PERISCOPE FOR AUTOS
Filed May 19, 1960
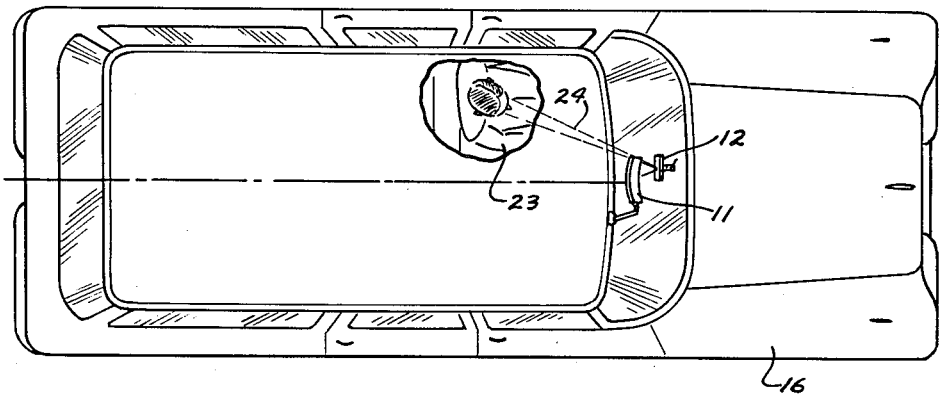
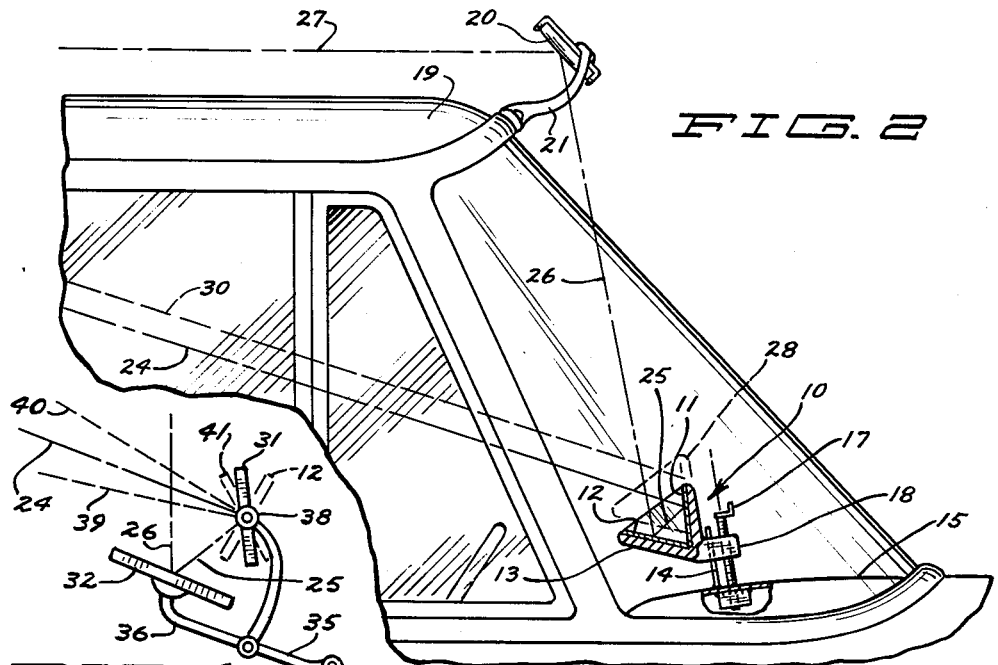
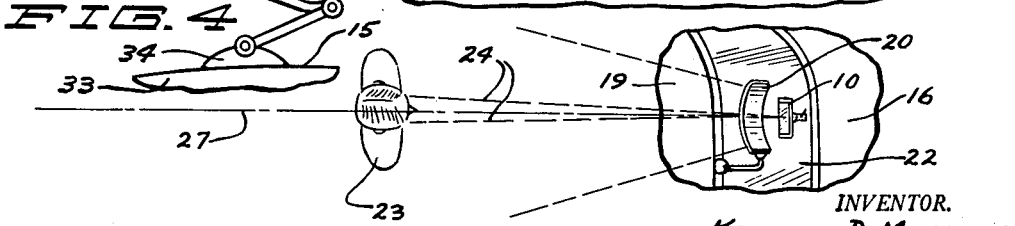
INVENTOR.
KENNETH D. MATTSSON
BY
Braddock and Braddock
ATTORNEYS

United States Patent Office 3,058,395
Patented Oct. 16, 1962

3,058,395
REAR VISION PERISCOPE FOR AUTOS
Kenneth D. Mattsson, 1719 N. Broad, Mankato, Minn.
Filed May 19, 1960, Ser. No. 30,240
4 Claims. (Cl. 88—86)

The invention herein relates to rear view mirrors and more particularly to a readily adjustable mirror arrangement installed on an automobile whereby unrestricted rearward vision is obtained. The rearward vision of a driver using internal mirrors in present low silhouette autos is limited under ideal conditions and completely blocked by passengers in the center seats, by condensation, ice, mud and the like on the rear window, and, for example, by a boat trailer being towed. An external mirror mounted on a side panel or fender constantly comes out of adjustment from vibration and other causes and is difficult to adjust for drivers of different heights. In addition, the driver's attention to the road ahead is distracted greatly when using external mirrors and the field of rearward vision is limited.

Restriction of rearward vision is a major cause of automobile accidents and safety officials and automobile manufacturers are constantly seeking a better rear view mirror.

Various devices to improve rearward vision have been advanced but installation of these devices on an automobile has required unsightly structural changes and complicated apparatus for adjustment.

An object of this invention is to provide an economical, easily installable, internally adjustable rear view mirror arrangement for automobiles whereby the driver's field of vision rearwardly and sidewardly from an automobile is as unobstructed as is the windshield through which he views the road ahead.

In the drawings:

FIG. 1 is a top plan view of an automobile partially cut away to show a driver looking into a rear view mirror arrangement according to the present invention;

FIG. 2 is a fragmentary side elevational view of said automobile and said rear view mirror arrangement;

FIG. 3 is a fragmentary top plan view of a first modified form of the invention; and FIG. 4 is a fragmentary side elevational view of a second modified form of the invention.

Referring to FIGS. 1 and 2 and the numerals of reference thereon, in a first form of the invention, a lower mirror group 10 comprises an upper mirror 11 and a lower mirror 12 mounted at a fixed angular relationship to one another in a housing 13. A forwardly projecting arm 18 of said housing 13 is slidably fitted on a support rod 14 which is fixedly attached to a dashboard 15 of an automobile 16. A threaded crank 17 is threadably mounted through a side arm 18 and rotatably mounted to dashboard 15.

An outside mirror 20 is mounted on a support arm 21 which is fixedly attached to a forward edge of a roof 19 of said automobile above a section of windshield 22 which is kept clean for good forward vision. Said outside mirror is located above roof 19 in a position to receive an image from the rear and reflect it downward through windshield 22 to mirror 12 of group 10.

A line of vision of a driver 23 is represented by broken line 24 sighting into mirror 11 which is at a suitable angle to reflect the vision downwardly and rearwardly along line 25 into mirror 12 which in turn is situated to reflect the vision upwardly along line 26 through windshield 22 into mirror 20 which reflects the vision rearwardly above roof 19 along line 27 and thereby gives the driver full rearward vision. Mirror 20 is convex as shown to increase the rearward field of vision, but need not be so.

Support rod 14 is positioned parallel to line of vision 26. Once the outside mirror 20 is properly positioned with respect to lower mirror group 10 the only mirror adjustment necessary for a shorter or taller driver is to turn crank 17. This raises or lowers mirror group 10 to a second position such as 28 without changing the angular relationship between any of the mirrors, thereby maintaining an identical field of rearward vision for drivers of various heights.

As mirror 11, into which the driver looks, is mounted on the dashboard of an automobile, the blind spot caused by mirrors hung from the top of the windsheld is eliminated. With a three mirror arrangement the image viewed by the driver is in its normal position, rather than inverted as when only two mirrors are used.

Referring to FIG. 3, in a second form of the invention, parts identical with parts in FIGS. 1 and 2, are identically numbered. This figure illustrates a variation of the present invention wherein mirror group 10 and outside mirror 20 are positioned directly in front of a driver 23. In this position a driver's vision will be even less distracted from the road when looking rearward than when the mirrors are located in a conventional position toward the middle of the automobile.

Referring to FIG. 4, in a third form of the invention, parts identical with parts in previous figures are identically numbered. A mirror 31 is pivotally fastened on a central axis 38 to an arm 37 which is adjustably fastened to a second arm 35 at a pivot point 34. Arm 35 is pivotally fastened to a base 33 which is fixedly attached to dashboard 15. A second mirror 32 is positioned rearwardly and below said mirror 31 and is adjustably mounted on an arm 36 which is attached to arm 35 at pivot point 34.

A line of vision of a first driver is represented by line 24 and can be considered as if it is sighting into mirror 31 which is positioned at a suitable angle to reflect the vision along line 25 to mirror 32 which reflects the vision outwardly along line 26 to mirror 20 which reflects the vision rearwardly above the automobile. A second shorter driver sighting along a line represented by the line 39 adjusts mirror 31 by tilting said mirror about its axis 38 to a second position 41 represented by dotted lines. A third taller driver with a line of vision represented by line 40 adjusts mirror 31 by rotating it to a third position 42 represented by dotted lines. The vision is then reflected along line 25 to mirror 32 and upwardly along line 26 to mirror 20 as previously described. Thus the only adjustment necessary for drivers of different heights after mirrors 31 and 32 are initially positioned is to rotate the mirror 31 about axis 38.

What is claimed is:

1. The combination with a vehicle having a roof and a dashboard in spaced relation to each other and a rearwardly and upwardly inclined front windshield, of: a rear view mirror arrangement having a first rearwardly and downwardly facing mirror disposed forwardly from and above said roof, a second mirror adjacent to said dashboard, facing upwardly and forwardly to receive a reflected image passing through said windshield from said first mirror, a third mirror adjacent, above, facing rearwardly and having an angular relation to said second mirror such that a reflected image from said second mirror will be directed rearwardly toward the eyes of an operator of said vehicle, said second and third mirrors being mounted in a housing having an outwardly projecting portion slidably mounted on a guideway fixedly attached to said dashboard for movement parallel to the path of reflected light between said first and second mirrors and adjustable means for moving said housing along said guideway to any one of a plurality of fixed positions.

2. The combination as specified in claim 1 wherein said adjustable means for moving said housing includes a crank threadably mounted through said housing and rotatably mounted to said dashboard.

3. The combination with a vehicle having a roof and a dashboard in spaced relation to each other and a rearwardly and upwardly inclined front windshield, of: a rear view mirror arrangement having a first outwardly and downwardly facing mirror disposed forwardly from and above said roof, a second mirror adjacent to said dashboard, facing upwardly and forwardly to receive a reflected image through said windshield from said first mirror, a third mirror adjacent, above and at a fixed angular relation to said second mirror, facing rearwardly to receive a reflected image from said second mirror and to direct said image rearwardly toward the eyes of an operator of said vehicle, said second and third mirrors being mounted in a housing having an outwardly projecting portion slidably mounted on a guideway fixedly attached to said dashboard for movement parallel to the path of reflected light between said first and second mirrors and adjustable means for moving said housing along said guideway to any one of a plurality of fixed positions.

4. The combination with a vehicle having a roof and a dashboard in spaced relation to each other and a rearwardly and upwardly inclined front windshield extending generally between said roof and said dashboard, of: a rear view mirror arrangement having a first rearwardly and downwardly facing mirror disposed forwardly from and above said roof, a second mirror adjacent to said dashboard, facing upwardly and forwardly to receive a reflected image passing through said windshield from said first mirror, a third mirror adjacent, above, facing rearwardly and having an angular relation to said second mirror such that a reflected image from said second mirror will be directed rearwardly toward the eyes of an operator of said vehicle, a housing, said second and third mirrors being mounted in said housing, and adjustable means mounting said housing to said dashboard to allow said housing to be moved to a plurality of positions without changing the angular relationship between said first and second mirrors.

References Cited in the file of this patent

UNITED STATES PATENTS

| | | |
|---|---|---|
| 2,221,449 | Hoeninghausen | Nov. 12, 1940 |
| 2,346,739 | Ewing | Apr. 18, 1944 |
| 2,570,357 | Martin | Oct. 9, 1951 |

FOREIGN PATENTS

| | | |
|---|---|---|
| 464,260 | Italy | July 26, 1951 |